United States Patent
Plüss et al.

(10) Patent No.: US 7,598,872 B2
(45) Date of Patent: Oct. 6, 2009

(54) METHOD FOR RECOGNIZING IDENTIFICATION MEDIA

(75) Inventors: Marcel Plüss, Tann (CH); Andreas Koch, Radolfzell (DE); Peter Hausmann, Pfaffhausen (CH)

(73) Assignee: Legic Identsystems AG (CH)

( * ) Notice: Subject to any disclaimer, the term of this patent is extended or adjusted under 35 U.S.C. 154(b) by 294 days.

(21) Appl. No.: 10/591,415

(22) PCT Filed: Feb. 28, 2005

(86) PCT No.: PCT/CH2005/000112

§ 371 (c)(1),
(2), (4) Date: Sep. 1, 2006

(87) PCT Pub. No.: WO2005/086069

PCT Pub. Date: Sep. 15, 2005

(65) Prior Publication Data

US 2007/0188326 A1    Aug. 16, 2007

(30) Foreign Application Priority Data

Mar. 3, 2004    (CH) ...................... 351/04

(51) Int. Cl.
*H04Q 5/22*    (2006.01)
*G08B 13/14*    (2006.01)

(52) U.S. Cl. ............... 340/572.4; 340/10.33; 340/10.52

(58) Field of Classification Search ............. 340/10.51, 340/10.52, 10.42, 572.4, 527.1, 10.33, 10.34; 235/440, 446, 451, 492, 375, 385
See application file for complete search history.

(56) References Cited

U.S. PATENT DOCUMENTS 6,202,927 B1 *    3/2001    Bashan et al. ................ 235/451

6,476,708 B1 *    11/2002    Johnson .................... 340/10.34
6,535,136 B1    3/2003    Rodenbeck et al. ...... 340/686.6
6,905,074 B2    6/2005    Charrat ........................ 235/492
7,016,647 B2 *    3/2006    Albert et al. ................ 455/41.2

FOREIGN PATENT DOCUMENTS

| EP | 0 944 014 A2 | 9/1999 |
| EP | 1 530 150 | 5/2003 |
| WO | WO 97/34265 | 9/1997 |
| WO | WO 01/95243 A2 | 12/2001 |

OTHER PUBLICATIONS

International Search Report dated Sep. 2, 2005 (German).

* cited by examiner

*Primary Examiner*—Jennifer Mehmood
(74) *Attorney, Agent, or Firm*—Ostrolenk Faber LLP (57) ABSTRACT

The invention relates to a method for recognizing identification media in the communication area of a write/read device functioning according to the principle of inductive coupling in the MHz range, wherein an antenna is used for transmitting and receiving HF signals, in addition to a circuit for transmitting HF signals with a standard transmitter power output and a logic circuit for evaluating communication between a write/read device and an identification medium. A short inquiry signal consisting of several fundamental components of the HF field and having a standard transmission power output is periodically transmitted via a transmission path and the antenna and a response signal is detected on the antenna. The response signal is compared to a reference signal and a communication signal is transmitted in order to recognize an identification medium in the event that the response signal is different from the reference signal. This enables energy-saving, reliable recognition of identification media occurring in the field of communications for subsequent communication with the write/read device, particularly with respect to battery-operated write/read devices.

22 Claims, 4 Drawing Sheets

METHOD FOR RECOGNIZING IDENTIFICATION MEDIA

CROSS REFERENCE TO RELATED APPLICATION

The present application is a 35 U.S.C. §§ 371 national phase conversion of PCT/CH2005/000112, filed Feb. 28, 2005, which claims priority of Swiss Application No. 351/04, filed Mar. 3, 2004, which is herein incorporated by reference. The PCT International Application was published in the German language.

BACKGROUND OF THE INVENTION

1. Field of the Invention

The invention relates to a method for detecting identification media within the communication range of an antenna of a read/write unit according to the preamble of claim 1.

It is known that between an antenna of a read/write unit based on the principle of inductive coupling of an RF field and a conductive object, for example an identification medium, inductive coupling occurs in the vicinity of the antenna as soon as the RF field is switched on.

In RFID (radio frequency identification) systems, contactless communication between an identification medium and a read/write unit is based on this inductive coupling. In a read/write unit with power line connection in which the current consumption does not matter, the RF field can be switched on as often and as long as desired in order to look for an identification medium within the communication range and to set up a communication. Accordingly, communication is set up in such read/write units by means of a communication signal for authenticating a passive identification medium. For this purpose, the RF field is switched on, e.g. every 200 ms, an authentication signal (with modulation) of some ms duration is sent out and a response is awaited. Because of the relatively high current consumption, this method is not optimal for battery-operated read/write units. In this case, it would be very advantageous to send the communication signal only when an identification medium is located within the communication range of the antenna of a read/write unit. The problem is to detect when this is the case. Proximity detectors for solving this problem, e.g. optical ones, require additional circuits and respond to any objects—they cannot specifically indicate an identification medium or its coupling to the RF field.

2. Description of the Art

From EP 0 944 014, a method is known which is intended to enable identification media to be detected within the vicinity of a read/write station, but only in the lower RF band, i.e. in the previous standard band of 125 KHz. However, this method is not applicable to high-power RFID systems with carrier frequencies in the MHz band, preferably above 5 MHz or 10 MHz and especially at 13.56 MHz where much higher information transmission rates and much more sophisticated and further applications are possible than in the standard 125 KHz band. Such high-power systems in the MHz band are known, e.g. from WO 97/34265.

The method according to EP 0 944 014 is based on the excitation of the resonance frequency of an antenna by means of a single pulse and measuring the decay characteristic of this signal. In this method, a short rectangular single pulse of, e.g. 2 μs duration (i.e. much shorter than a fundamental oscillation of approx. 8 μs at 125 KHz) is generated with reduced current and used for exciting a transmitting antenna into natural oscillation at its resonance frequency. After a waiting time of, e.g. 200 μs (corresponding to approx. 25 fundamental oscillations), during which the single signal decays, the decayed single-pulse signal is measured over, e.g. 20 μs via a receiving antenna. With an identification medium in the vicinity of the read/write unit, the signal decays more strongly than without. Correspondingly, the presence of an identification medium is concluded if the single-pulse signal or the natural oscillation decays below a certain value.

However, this method for the 125 KHz band, could not be implemented at all for several reasons in high-power systems in the MHz band: a single pulse which is much shorter than the fundamental oscillation of, e.g. 0.1 μs at 10 MHz cannot be achieved and the decaying of a single pulse or of a natural oscillation which must occur 100-times more rapidly here than in the 125 KHz band, could not be measured at all, and an influence of an identification medium on the decay of a single pulse even less.

This method according to EP 0 944 014 has other disadvantages: generating a short single pulse which does not correspond to the fundamental oscillation for the RF communication requires an additional circuit. During the waiting time, this circuit must be active. It is not possible to detect identification media within the entire communication range in which the RF communication takes place with higher power, by means of a single pulse generated with reduced current. Neither is this known method suitable for detecting identification media with a resonant frequency which clearly differs from those of the antennas of the read/write unit.

In high-power systems in the MHz band, preferably at least 5 MHz or at least 10 MHz and especially at 13.56 MHz, the known microprocessors cannot be used for carrying out relatively slow measuring methods of the decay characteristic of natural oscillations for standard systems with 125 KHz by exciting the antenna at its natural frequency, switching off and measuring the decay characteristic of these natural oscillations within a measuring time of, e.g. 0.2-1 ms (e.g. by measuring a start value and an end value of the amplitudes within the measuring time or by counting the number of oscillations until they have decayed to a certain threshold value). In particular, e.g. in a 13.56 MHz system, the natural oscillation must have decayed completely to the value 0 within 2.4 μs so that communication can be carried out here. It would not be possible to measure any decay characteristic within this very short time.

SUMMARY

It is the object of the present invention, therefore, to overcome the previous disadvantages and restrictions and to create a method for detecting all identification media within the communication range of a read/write unit in high-power RFID systems with carrier frequencies in the MHz band and, at the same time, with minimized current consumption which is of great importance especially for battery-operated read/write units. In addition, it should also be possible to minimize interference effects of the environment on the antenna field so that an identification medium can be detected more reliably. It is also intended to enable identification media to be detected, the resonant frequency of which distinctly deviates from that of the antenna.

According to the invention, this object is achieved by a method as claimed in claim 1 and by a read/write unit as claimed in claim 22. The dependent claims relate to developments of the invention with additional improvements of the method with regard to energy saving, reliable detection of identification media and compensation for interference effects. A particularly advantageous embodiment consists in the fact that the return signal of the current measuring period is used as the reference value for the next measuring period.

DESCRIPTION OF THE DRAWINGS

In the text which follows, the invention will be explained in greater detail with reference to figures and examples. In the FIGS.

DESCRIPTION OF THE EMBODIMENTS

Figure 1:
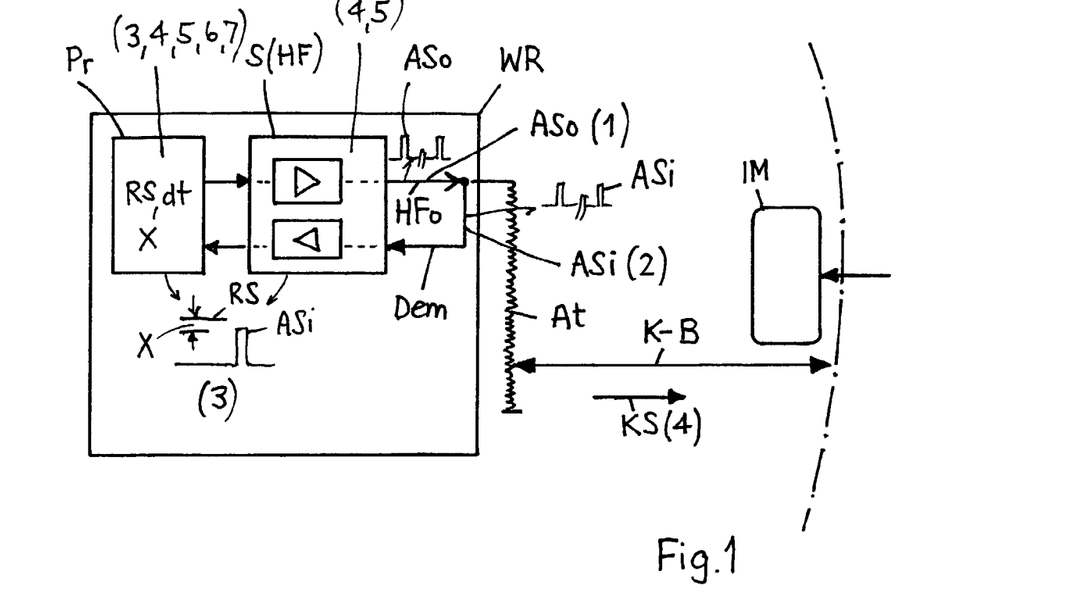
FIG. 1 shows a read/write unit according to the invention for carrying out the method.

FIG. 1 shows a read/write unit WR for carrying out the method according to the invention for detecting identification media IM within the communication range K-B of the read/write unit WR. The read/write unit contains a common antenna At for transmitting and receiving RF signals in accordance with the principle of inductive coupling of an RF field in the MHz frequency band, a transmitting path HFo connected directly to the antenna, a receiving path Dem connected directly to the antenna, a circuit S(HF) for RF communication (modulated and unmodulated) with a standard transmitting power P-HF and a logical circuit Pr for evaluating a communication between the read/write unit and an identification medium IM.

To recognize identification media IM which enter into the communication range K-B, a short polling signal ASo, which contains a number of fundamental oscillations of the RF field, is periodically emitted with the standard transmitting power P-HF via the transmitting path HFo and the antenna At (method step 1), then, during the emission of the polling signal ASo, a return signal ASi, which also contains a number of fundamental oscillations of the RF field, is simultaneously detected at the antenna (method step 2), then, the return signal ASi is compared with a reference signal RS (3) and then a communication signal KS for identifying an identification medium IM is sent out (4) if the return signal ASi differs from the reference signal RS (3-2). Otherwise, another polling signal ASo is sent in the next cycle (3-1). For the comparison with the return signal ASi, the reference signal RS can also be reduced by a threshold value X (reference value is thus =RS−X, see FIGS. 4b and 7). If an authorized identification medium IM is found with the communication signal KS and authenticated (5), communication takes place with this (5-2). After the end of the communication, the polling signal ASo is sent out again. This is also illustrated further and explained in the diagram of FIG. 7. The forced excitation of the antenna At with the fundamental oscillations of the RF field with full transmitting power P-HF also makes it possible to detect identification media IM with resonant frequencies deviating greatly from the fundamental oscillation (of, e.g. up to 18 MHz for 13.56-MHz-RFID systems) in spite of correspondingly weaker inductive coupling.

The method according to the invention can already be implemented in read/write units WR according to FIG. 1 if, by means of its components, the return signal ASi can be detected via the receiving path Dem and in the circuit S(HF) and can then be processed in the logical circuit Pr e.g. by means of an A/D converter. This possibility of implementation without additional components is an essential advantage of the method according to the invention.

Figure 2:
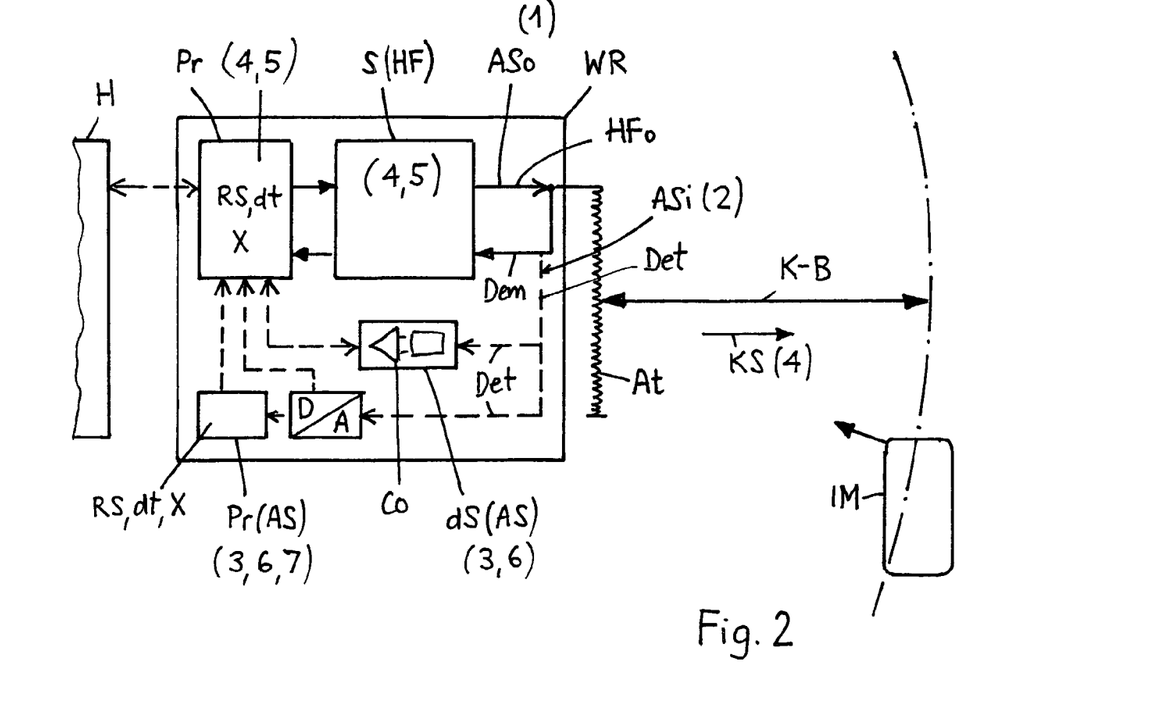
FIG. 2 shows a read/write unit with separate detection path and separate evaluation elements.

FIG. 2 shows various possible supplements with additional components if the read/write unit cannot perform all functions of the recognition method. If the return signal ASi cannot be detected via the receiving path Dem or not evaluated in the logical circuit Pr, such read/write units could be upgraded in a simple manner with minimum component expansion. The return signal ASi is then detected via a separate detection path Det and, for example, the return signal is evaluated and compared with the reference signal RS by means of a discrete circuit dS(AS) with a comparator Co, or, after an A/D conversion, in an additional logical circuit Pr(AS). The circuits dS(AS) and Pr(AS) can be connected to the logical circuit Pr. Additionally, an application computer H could also contribute to coordinating the signals (if an application computer H can transmit information to a read/write unit WR via a radio link but cannot deliver power to the read/write unit). As shown in FIG. 2, the return signal ASi can be compared with a reference signal RS by analog means via a comparator Co of a discrete circuit dS(AS) or, after an A/D conversion, digitally by the logical circuit Pr or by a separate logical circuit Pr(AS).

Figure 3:
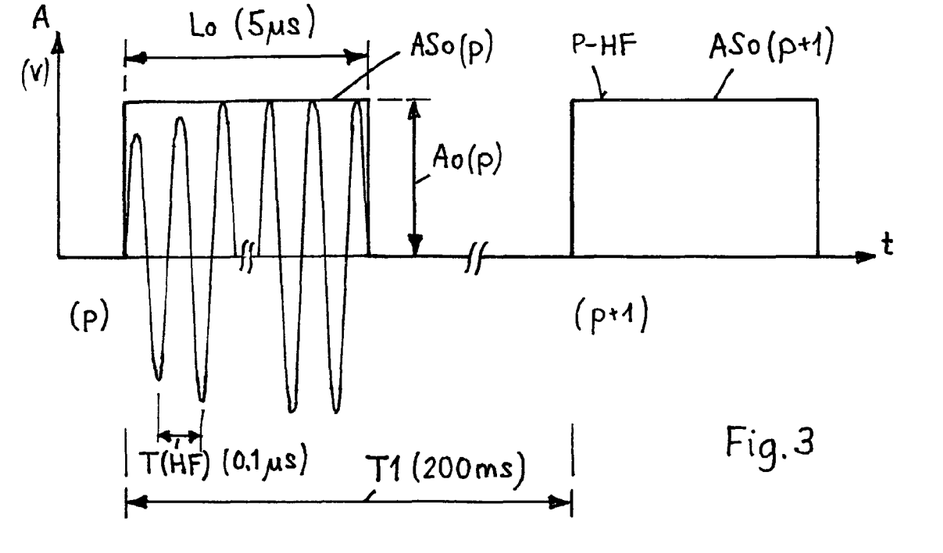
FIG. 3 shows a polling signal.

FIG. 3 shows the amplitude A as a function of time t of a polling signal ASo according to the invention which is generated with the standard transmitting power P-HF and which contains a number of (unmodulated, force-excited) fundamental oscillations of the RF field. The short polling signal ASo has a pulse width or signal duration Lo of, e.g. Lo=4-10 µs. At 10 MHz, this corresponds to 40-100 fundamental oscillations with a period T(HF) of 0.1 µs. The polling signal is emitted periodically with a polling interval T1 of, e.g. T1=100-300 ms between a polling period p and the next polling period p+1. Depending on demand, a longer polling interval T1 of, e.g. 1-3 sec can also be variably selected with correspondingly even lower energy consumption (e.g. during marginal times).

Figure 4A:
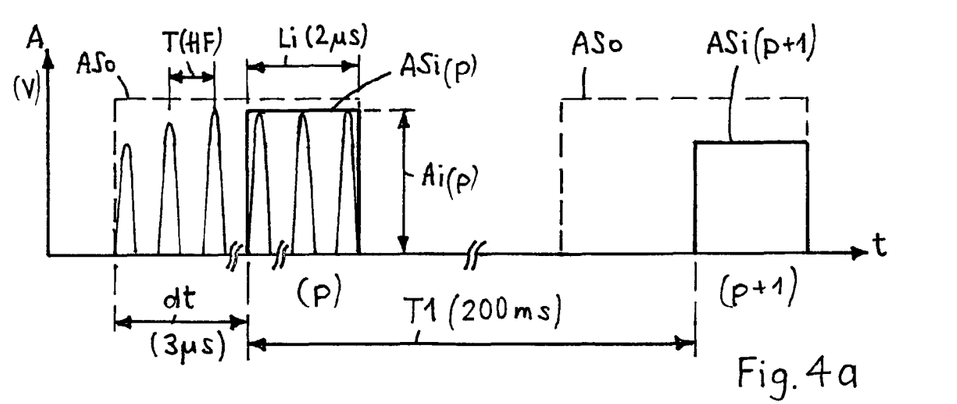
FIG. 4a shows a return signal with reference to the polling signal.

FIG. 4a shows the amplitude A(t) as a function of time of a return signal ASi which corresponds to the polling signal ASo of FIG. 3. The detection of the return signal ASi at the antenna At (FIG. 1) occurs simultaneously with the transmission of the polling signal. The return signal ASi is preferably only measured or detected after a defined time delay dt, i.e. in the second half or towards the end of the incoming return signal. As an example, let the pulse width Lo of the polling signal be Lo=5 µs, the time delay dt=3 µs and the pulse width of the measured return signal Li=2 µs. At 10 MHz, this width corresponds to 20 fundamental oscillations in the detected return signal ASi. The return signal ASi preferably comprises at least 10 fundamental oscillations. Within the delay time dt, settling processes can take place whereby only stable fundamental oscillations are detected as return signal in the detected measurement range Li.

Figure 4B:
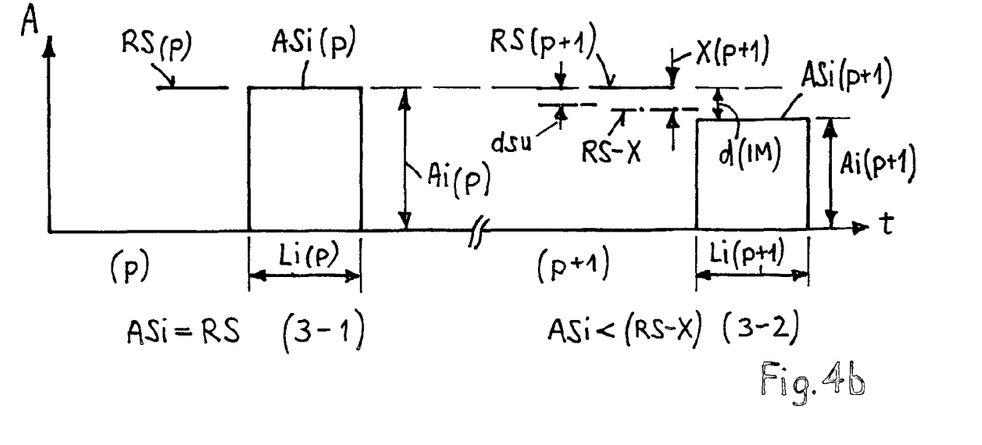
FIG. 4b shows a comparison of return signal with a reference signal.

FIG. 4b shows the comparison of the detected return signal ASi with the reference signal RS or, respectively, with a reference value RS−X, i.e. a reference signal RS reduced by a threshold value X. In the measuring period p (on the left in FIG. 4b), the return signal ASi(p) is assumed to be of the same magnitude as the reference signal RS(p) since there is no identification medium within the communication range K-B which would reduce the return signal. This corresponds to method step 3-1, i.e. no communication signal KS is emitted but a polling signal ASo(p+1) again in the next measuring period p+1. For example, a threshold value X can be defined simply by a comparator Co or its drive system.

The return signal ASi can be compared with the reference signal RS (or with a reference value RS–X, respectively) in a simple manner by measuring the amplitudes Ai or also by measuring the pulse widths Li in a suitably defined manner.

In the example on the right in FIG. 4b, the previous return signal ASi(p) has been set as the new reference signal RS(p+1) as a particularly advantageous embodiment. This makes it possible to compensate in a simple manner for a slow change in the environmental influence which is not caused by an identification medium. In this case, a threshold value X(p+1) is additionally defined wherein the return signal ASi(p+1) is compared with a reference value RS–X(p+1) (according to FIG. 7). In this case, it is assumed that an identification medium has entered into the communication range and the return signal ASi(p+1) is correspondingly reduced so that ASi(p+1) is less than RS–X (method step 3-2). Correspondingly, a communication signal KS is subsequently emitted for authenticating the identification medium IM (4).

With the adaptation of the reference signal RS (e.g., by continuously setting RS(p+1)=ASi(p)), slow changes in the return signal ASi due to environmental influences and disturbances are compensated for in principle. For this purpose, the reference signal can also be changed over time in accordance with a stored reference signal profile RSP(t) in order to compensate for known changes in time of environmental influences. The reference signal RS(t) can also be changed in self-adapting manner by continuously newly taking into consideration previous empirical data or reference signals for generating and storing a new adapted reference signal profile RSP(t). For example, the relationship between identification media detected correctly and those detected falsely can be included in the determination of the new reference values RS or also of the threshold value X, respectively. In principle, the influence d(IM) of an identification medium on the return signal ASi can be reliably detected by means of the threshold value X. For this purpose, the threshold value X is selected to be lower than the influence d(IM) of an identification medium but greater than the influence dsu of short-term disturbances and environmental changes on the return signal ASi.

This is diagrammatically illustrated in FIG. 4b: for example, let a short-term interfering influence be dsu=5%, an influence of the identification medium d(IM)=10% and the threshold value be set as X=7% of ASo. The interfering influence is not then detected (dsu is less than X) but the identification medium is detected (d(IM) is greater than X). The threshold value X can thus be used for setting the sensitivity of the detection of identification media. The threshold value X can be, e.g. 5-20%, preferably 5-10% of the polling signal ASo. However, the threshold value X, can also be 0%. This will be explained further with respect to FIG. 7.

Figure 5A:
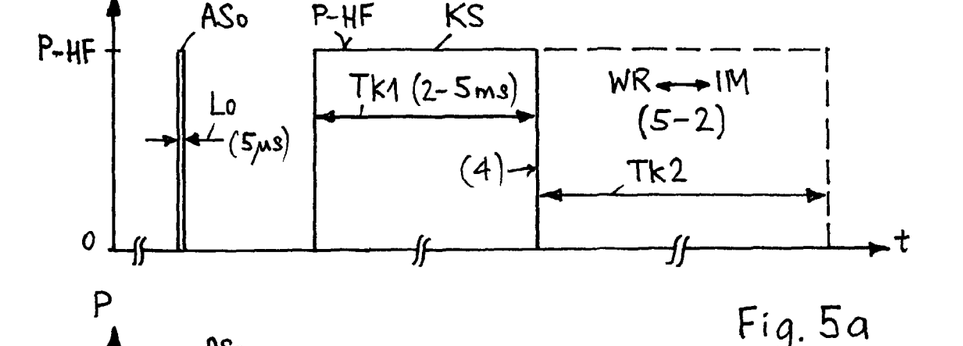
FIG. 5a shows a polling signal with reference to the communication signal with identical transmitting power.

FIG. 5a shows the variation with time of the transmitting power P(t) of a polling signal ASo and of a communication signal KS, both of which are generated with a standard transmitting power P-HF. As specified here, for example, the pulse width or signal duration Lo of the polling signal ASo of, e.g. Lo=5 µs is shorter by at least two orders of magnitude than the communication signal KS for authenticating a detected identification medium IM, the duration Tk1 of which is, e.g. Tk1=2-5 ms and is thus 400-100 times longer than the polling signal ASo with a correspondingly much higher energy demand if, as in the present case, a communication signal KS is periodically emitted, instead of the short polling signal ASo according to the invention, for recognizing identification media within the communication range. With the polling signal KS which corresponds to method step 4, RF energy is first transferred to the passive identification medium IM, then a modulated authentication signal is sent and then a response is awaited. After a positive authentication, a communication can be carried out between the read/write unit WR and the identification medium IM in a time Tk2 (step 5-2).

Figure 5B:
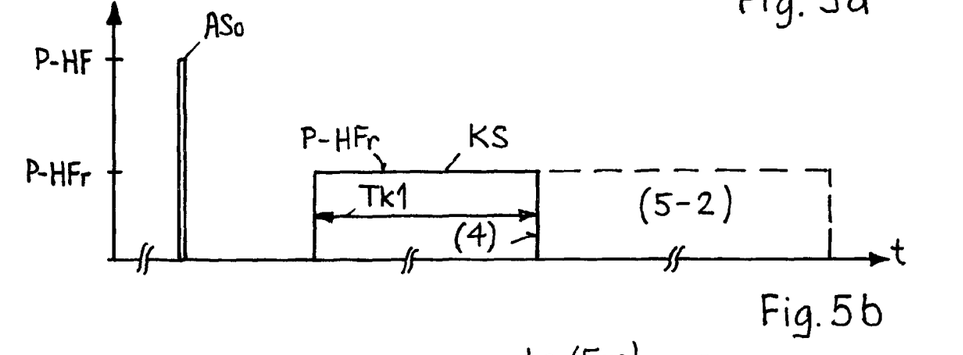
FIG. 5b shows a polling signal and a communication signal with reduced transmitting power.

FIG. 5b shows an example in which the communication signal KS is emitted with a transmitting power P-HFr reduced by at least a factor of 2 whereas the polling signal ASo is always emitted with full transmitting power P-HF. Thus, an identification medium IM is detected early when entering into the communication range K-B whereas communication with the read/write unit WR can also be reliably carried out with this reduced transmitting power P-HFr subsequently—in applications where the identification medium is held relatively close to the antenna of the read/write unit. A communication signal KS can also be emitted first with reduced transmitting power and, if no authentication takes place by this means, a communication signal KS can be emitted with full transmitting power P-HF again immediately thereafter.

On the basis of empirical data, the read/write unit WR can also adaptively determine in a self-learning manner whether the communication KS is to be emitted with the standard transmitting power P-HF or with a reduced transmitting power P-HFr.

Figure 6:
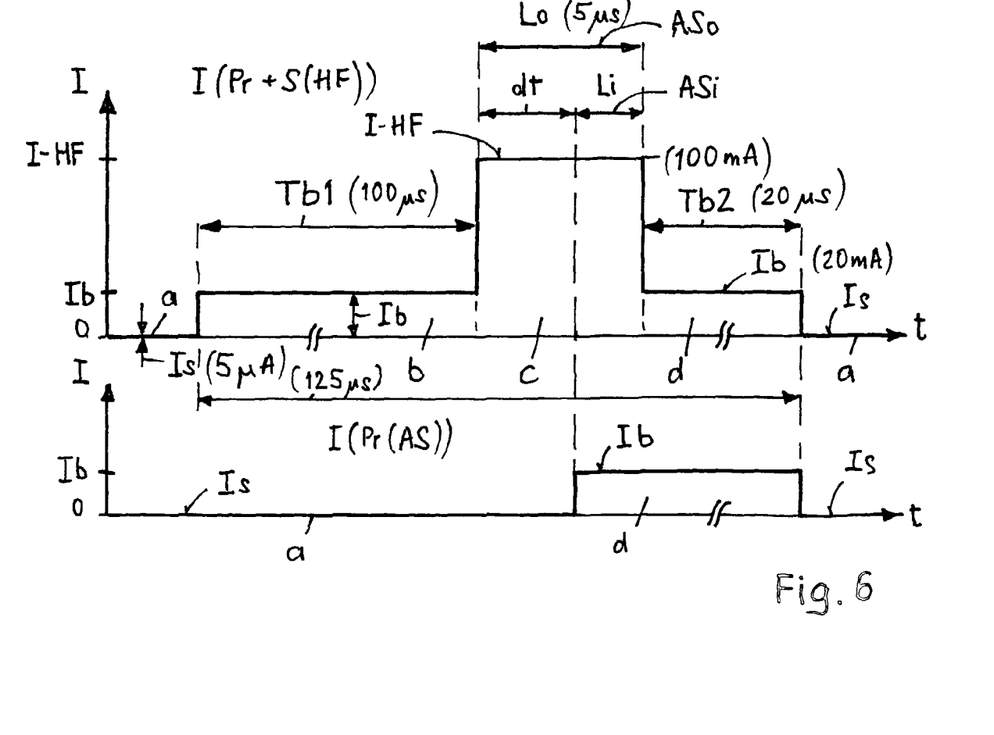
FIG. 6 shows the current consumption in the method according to the invention.

FIG. 6 shows the current consumption in the method according to the invention when emitting a polling signal ASo. The upper illustration of FIG. 6 shows the current consumption I(t) of the logical circuit Pr and of the RF circuit S(HF). In idle mode, the current consumption Is (stand-by current) is, e.g. 5 µA (a). Before the polling signal ASo is sent, the circuits Pr and S(HF) must be set into an operating mode (b) with an operating current Ib of, e.g. 20 mA during a time Tb1 of, e.g. 100-150 µs for settling a crystal. Then the polling signal ASo is sent with a current I-HF of, e.g. 100 mA during a transmitting duration Lo of, e.g. 5 µs (c). Then the return signal ASi is evaluated with the operating current Ib and within a time Tb2 of, e.g. 20 µs(d). The entire power-on time is here, e.g. 125 µs and the very short measuring time is less than 10 ps. In the lower part of FIG. 6, the required operating current Ib of an additional logical circuit Pr(AS) is shown if the evaluation (d) is done by this means and not by means of the logical circuit Pr. The current consumption for emitting a polling signal ASo is thus, for example:

$$Ib \times (Tb1+Tb2)+I\text{-}HF \times Lo = 20 \text{ mA} \times 120 \text{ µs} + 100 \text{ mA} \times 5 \text{ µs} = 2.9 \text{ µAs}.$$

In contrast, emitting a communication signal KS according to FIG. 5a requires a current consumption of, e.g.

$$I\text{-}HF \times Tk1 = 100 \text{ mA} \times 4 \text{ ms} = 400 \text{ µAs},$$

i.e. more than 100 times the current consumption for a polling signal ASo.

Figure 7:
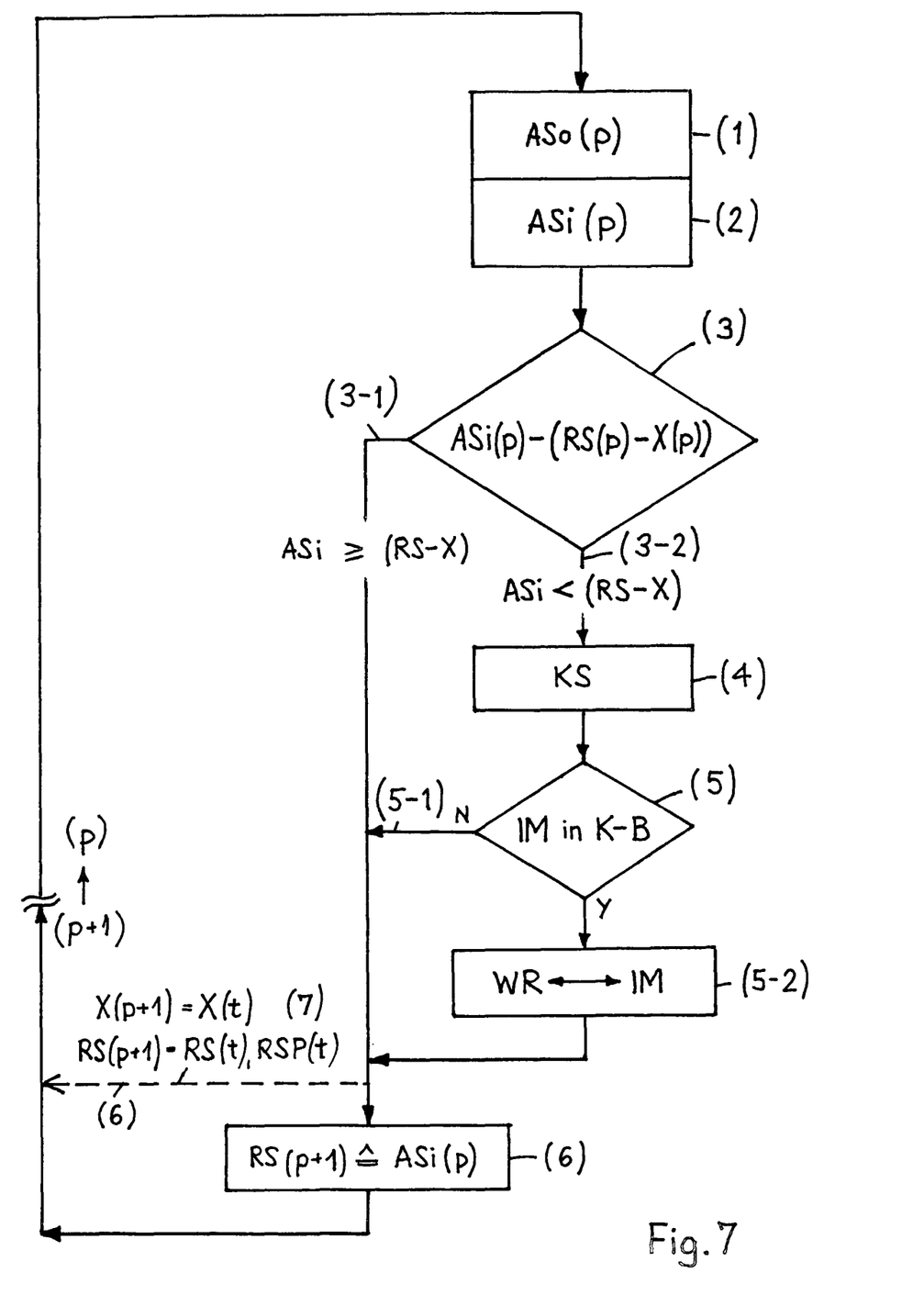
FIG. 7 shows a flowchart of the method according to the invention.

FIG. 7 shows the method according to the invention, and the various possibilities which can result from the comparison of the return signal ASi with the reference signal RS or with RS–X, respectively, in the form of a flowchart. After emitting the polling signal ASo (method step 1) and detecting a return signal ASi (2), the return signal ASi(p) of the polling period (p) is compared with the reference signal RS(p) (3) or compared with a reference value reduced by a threshold value X, RS(p)–X(p).

If the return signal ASi(p) is greater than or equal to the reference value (RS−X)(p) in this period (p), a polling signal ASo is emitted again in the next period (p+1) as previously (step 3-1).

If the return signal ASi(p) is lower than the reference value (ASi<RS−X) (step 3-2), a communication signal KS is emitted (4). If there is no authorized identification medium IM within the communication range K-B and this is successfully authenticated (because the return signal has changed due to coupling with an unauthorized identification medium or due to environmental influences and not due to the new presence of an authorized identification medium IM), a polling signal ASo is emitted in the next polling period (p+1) as previously (step 5-1).

If an authorized identification medium IM is detected, a communication takes place between the latter and the read/write unit WR (after successful authentication), e.g. for carrying out an application (5-2).

After the end of the communication, a polling signal ASo is emitted again in the next period possible.

For the next polling period (p+1), a new reference signal RS(p+1) can normally be set (step 6). If necessary, a new threshold value X(p+1) can also be set in exceptional cases (step 7).

FIG. 7 also shows a simple and advantageous possibility of minimizing environmental and interfering influences (due to other objects, e.g. due to a metal cabinet which is shifted into the vicinity of the read/write unit WR). For this purpose, the return signal ASi(p) of the period (p) can be adaptively used as reference signal RS(p+1) for the next period (p+1). An environmental or interfering influence on the return signal is thus continuously adapted and compensated for by means of the new reference signal.

If an identification medium IM additionally passes into the communication range K-B within the period (p+1) and, as a result, the return signal ASi(p+1) is reduced at least by the threshold value X, this is detected (3-2) and the communication signal KS is emitted (4). As is explained with reference to FIG. 4b, the sensitivity to interference can be minimized by means of an adjustable threshold value.

A simple exemplary application of the method according to the invention is a mechanical and electronic lock with a battery as energy supply and with mechanical keys which also contain an identification medium as electronic key. The previous detection method with periodic emission of a communication signal KS cannot be used at all in this case because of a much too high demand of energy from the battery. For this reason, additional mechanical contacts and electronic switches had to be used hitherto in order to detect an identification medium and switch on the communication with the latter. This additional expenditure can be omitted with the method according to the invention and the detection of an identification medium can thus be carried out more rapidly and more reliably, with very low current consumption from the battery.

The following designations are used in the description:
IM Identification medium, tag, card
K-B Communication range, near-field area
At Antenna
WR Read/write unit
HFo Transmitting path
Dem Receiving path
ASo Polling signal, emitted
ASi Return signal, detected
RS Reference signal
RSP Reference signal profile
KS Communication signal, polling signal for authentication and communication with an IM
Det Separate detection path
Co Comparator
X Threshold value
S(HF) RF circuit, component of WR
dS(AS) Separate discrete circuit for ASi
Pr Logical circuit, microprocessor of WR
Pr(AS) Separate logical circuit for evaluating ASi
P-HF Standard transmitting power of S(HF)
P-HFr Reduced transmitting power of S(HF)
t Time
dt Time delay for ASi
T(HF) Period of fundamental oscillation
T1 Polling interval
Tk1, Tk2 Duration of KS
Tb1, Tb2 Power-on time of Ib
p Number of polling period, measuring period
A, Ao, Ai Amplitudes
L, Lo, Li Pulse widths, signal duration
Lo Measuring time
dsu Interfering influence
d(IM) Influence of IM
H Application computer, host
I Current consumption
Is Stand-by current
Ib Current consumption in the operating mode
I-HF Current consumption during RF-signal emission
1-7 Method steps
1 Emitting ASo
2 Receiving, detecting ASi
3 Comparing ASi with RS or with RS−X, resp.
3-1 ASi greater than or equal to RS or RS−X, resp.
3-2 ASi less than RS or RS−X, resp.
4 Transmitting KS
5 Authentication
5-2 Communication with IM
6 Setting RS
7 Setting X

The invention claimed is:

1. A method for detecting identification media within a communication range of an antenna for transmitting and receiving RF signals of a read/write unit which operates in accordance with the principle of inductive coupling of an RF field in the MHz frequency band and which has a transmitting path connected directly to the antenna,
a receiving path connected directly to the antenna,
a circuit for RF communication with at least one of a standard transmitting power or reduced transmitting power, and a logical circuit for evaluating a communication between the read/write unit and an identification medium, wherein
a short polling signal, which contains at least one of unmodulated or force excited oscillations of the RF field, is periodically emitted with the standard transmitting power via the transmitting path and the antenna,
that during the emission of the polling signal, a return signal with at least one of unmodulated or force excited oscillations of the RF field is detected at the antenna,
then the return signal is compared with a reference signal, and then a communication signal is emitted for detecting an identification medium if the return signal differs from the reference signal.

2. The method according to claim 1, wherein the polling signal is shorter by at least two orders of magnitude than the communication signal.

3. The method according to claim 1, wherein the detection of the return signal is effected via the receiving path.

4. The method according to claim 1, wherein the detection of the return signal is effected via a separate detection path.

5. The method according to claim 1, wherein the comparison of return signal and reference signal is effected by the logical circuit.

6. The method according to claim 1, wherein the comparison of return signal and reference signal is effected in a separate logical circuit.

7. The method according to claim 1, wherein the comparison of return signal and reference signal is effected by means of a separate discrete circuit.

8. The method according to claim 1, wherein the return signal of the current measuring period is used as reference signal for the next measuring period.

9. The method according to claim 1, wherein the reference signal is changed over time in accordance with a stored reference signal profile.

10. The method according to claim 1, wherein the reference signal is self-adapting over time.

11. The method according to claim 1, wherein amplitudes of the return signal and reference signal are compared.

12. The method according to claim 1, wherein pulse widths of the return signal and reference signal are compared.

13. The method according to claim 1, wherein emission of the communication signal takes place if the return signal is below the reference signal by a defined threshold value.

14. The method according to claim 1, wherein the comparison of return signal and reference signal is effected by analog means via a comparator of a discrete circuit.

15. The method according to claim 1, wherein the comparison of return signal and reference signal, after an A/D conversion, is effected by digital means by the logical circuit or by a separate logical circuit.

16. The method according to claim 13, wherein the threshold value is defined by a comparator or its drive system.

17. The method according to claim 1, wherein there is a defined time delay between the beginning of the emission of a polling signal and the detection of the return signal.

18. The method according to claim 1, wherein the return signal contains at least 10 fundamental oscillations of the RF field.

19. The method according to claim 1, wherein the logical circuit is set from an idle mode into an operating mode before transmitting the polling signal.

20. The method according to claim 1, wherein the communication signal is emitted with a transmitting power reduced by at least a factor of 2.

21. The method according to claim 1, wherein the read/write unit adaptively determines in a self-learning manner whether the communication signal is emitted with standard transmitting power or with reduced transmitting power.

22. A read/write unit for detecting identification media within a communication range of an antenna for transmitting and receiving RF signals of the read/write unit which operates in accordance with the principle of inductive coupling of an RF field in the MHz frequency band and which has a transmitting path connected directly to the antenna, a receiving path connected directly to the antenna, a circuit for RF communication with at least one of a standard transmitting power or reduced transmitting power, and a logical circuit for evaluating a communication between the read/write unit and an identification medium, wherein a short polling signal, which contains at least one of unmodulated or force excited oscillations of the RF field, can be periodically emitted with the standard transmitting power via the transmitting path and the antenna, and during the emission of the polling signal, a return signal with at least one of unmodulated or force excited oscillations of the RF field can be detected at the antenna, then the return signal can be compared with a reference signal, and then a communication signal can be emitted for detecting an identification medium if the return signal differs from the reference signal.

* * * * *

UNITED STATES PATENT AND TRADEMARK OFFICE
CERTIFICATE OF CORRECTION

PATENT NO. : 7,598,872 B2
APPLICATION NO. : 10/591415
DATED : October 6, 2009
INVENTOR(S) : Plüss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 329 days.

Signed and Sealed this

Twenty-eighth Day of September, 2010

David J. Kappos
*Director of the United States Patent and Trademark Office*